A. KADOW.
AIR CONTROLLING MECHANISM FOR GLASS BLOWING MACHINES.
APPLICATION FILED SEPT. 11, 1912.

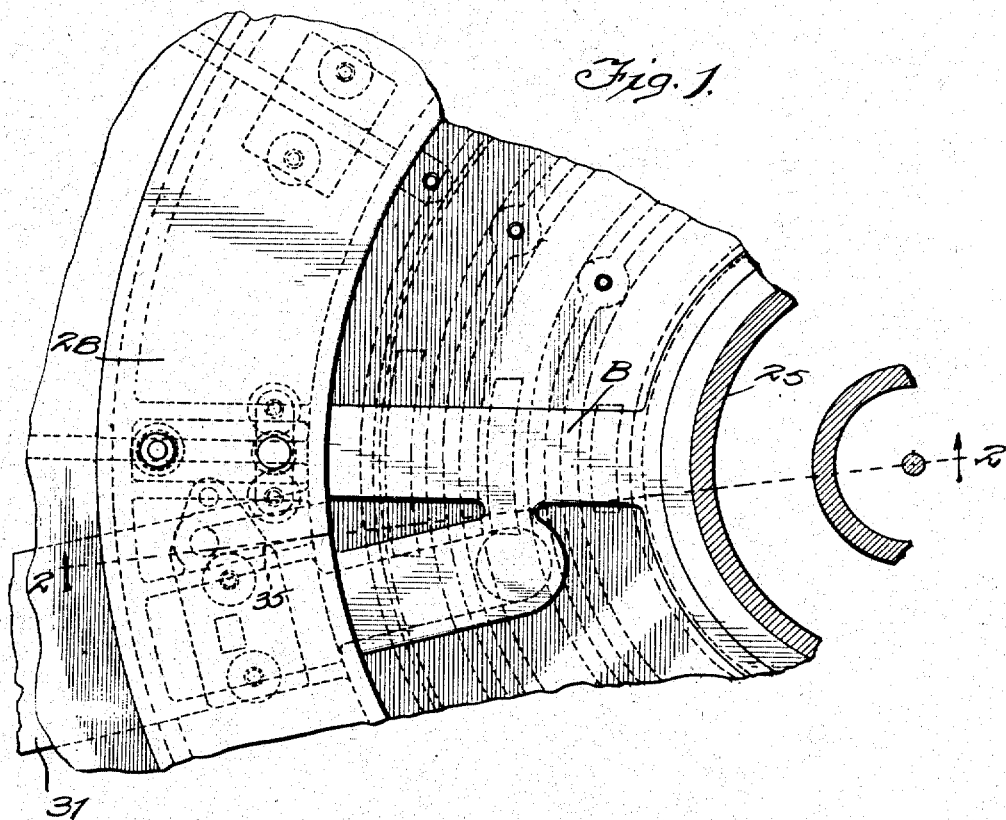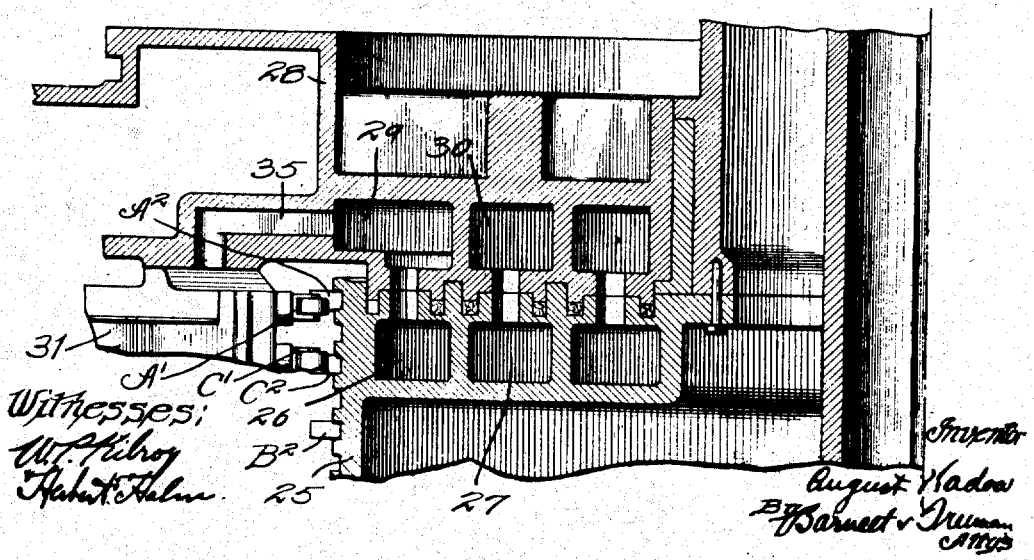

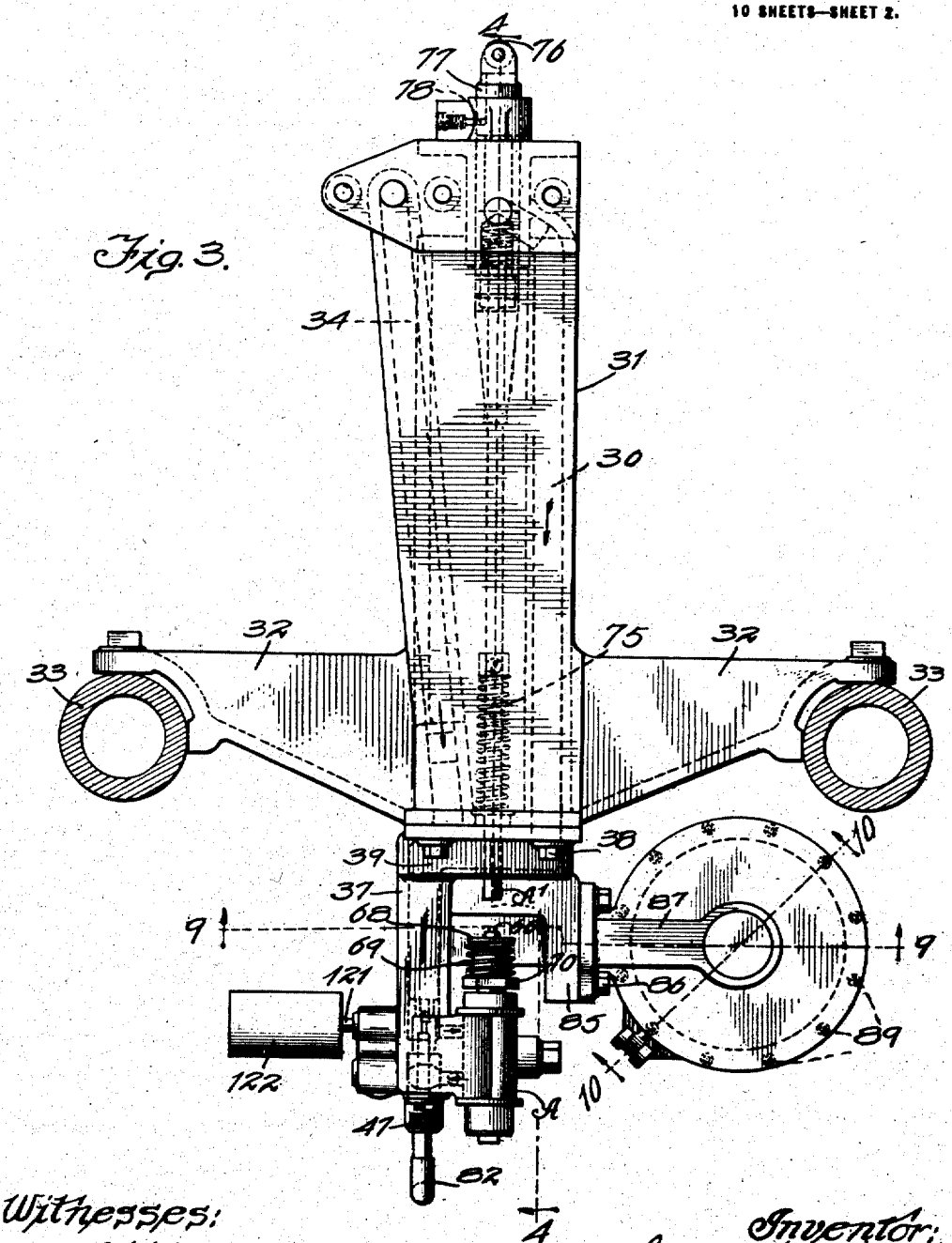

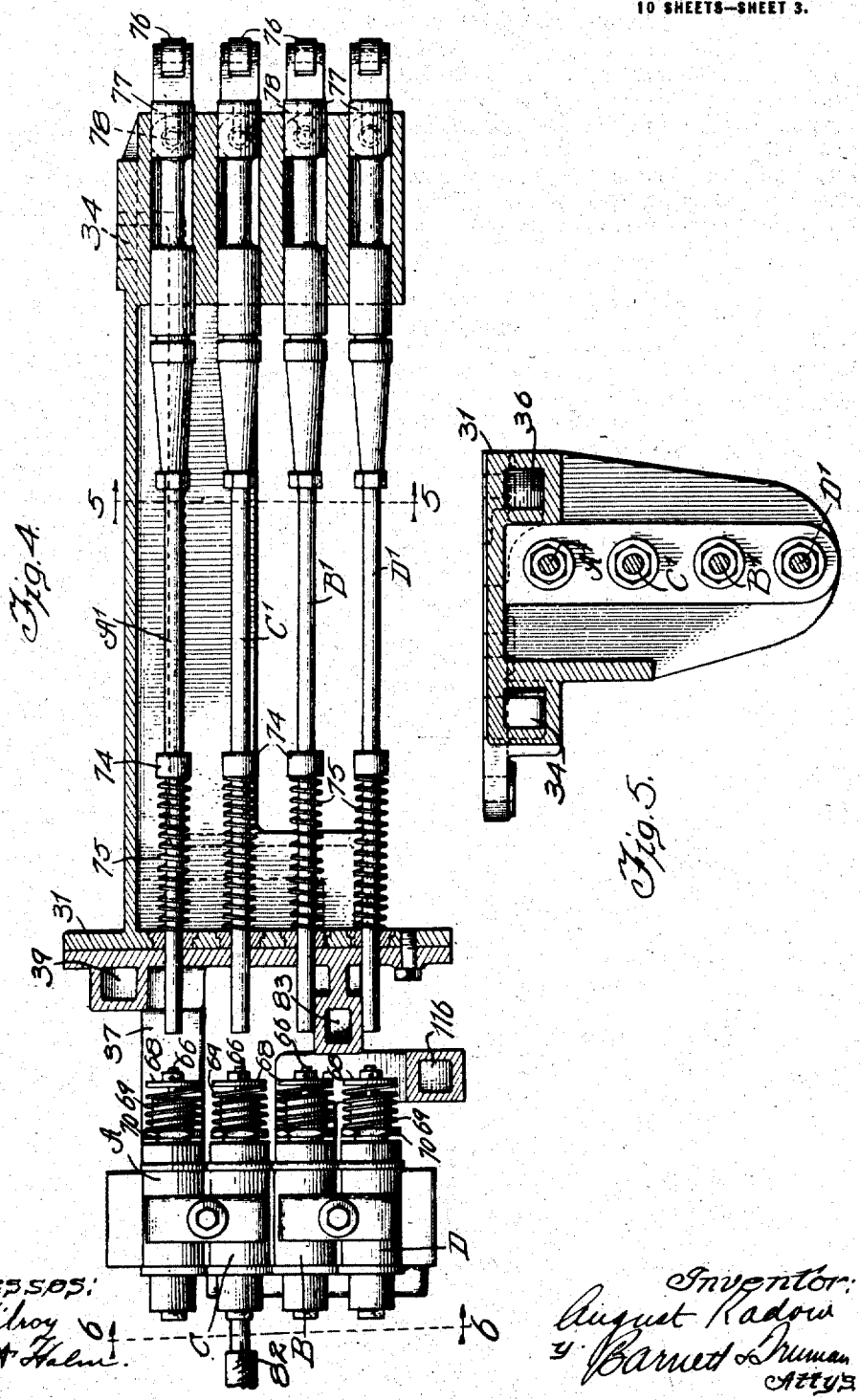

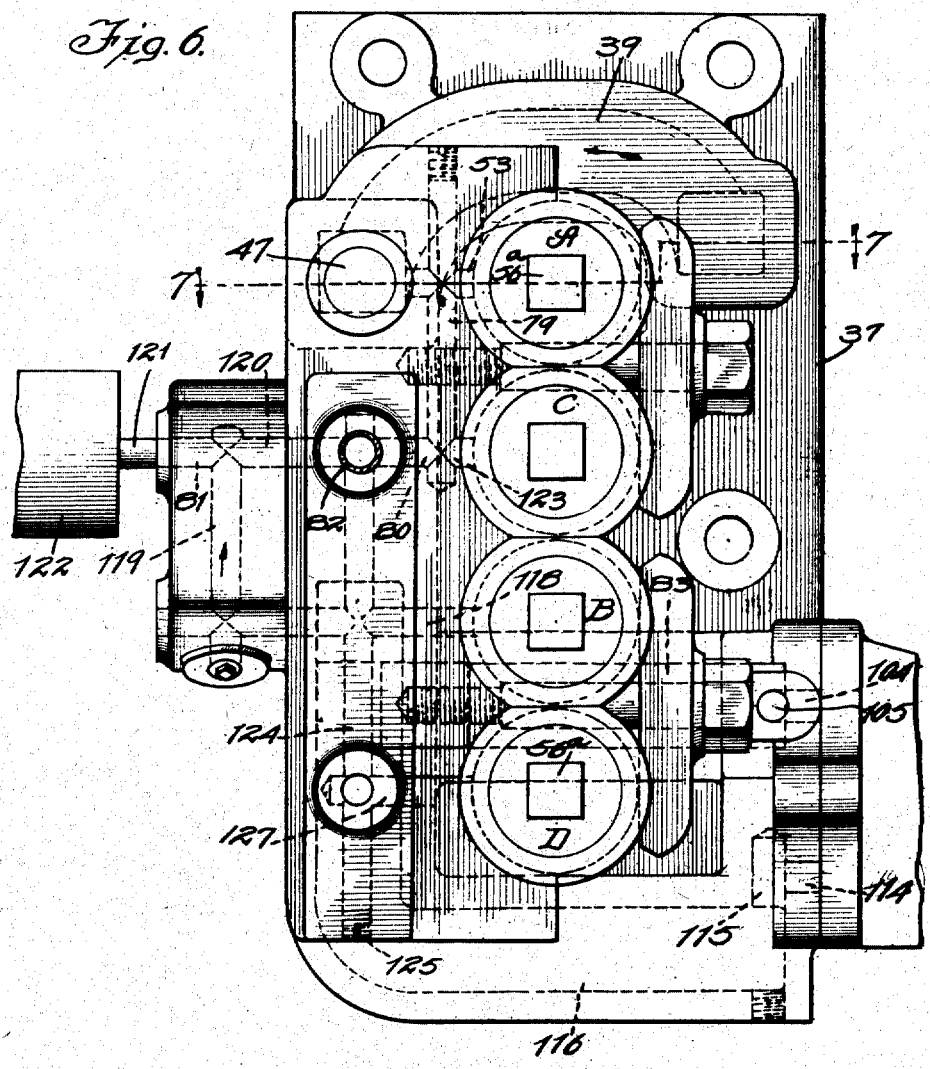

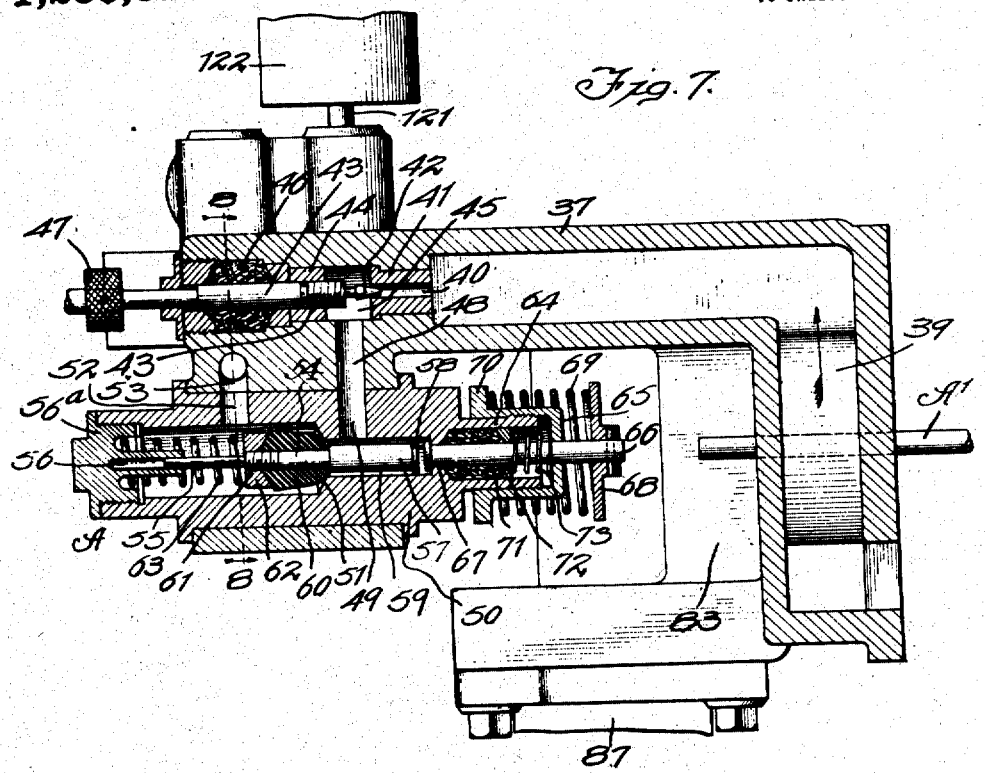
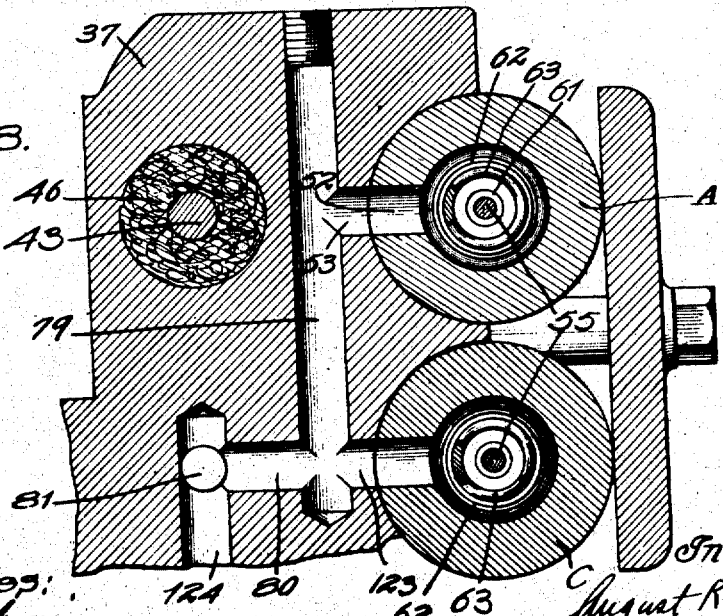

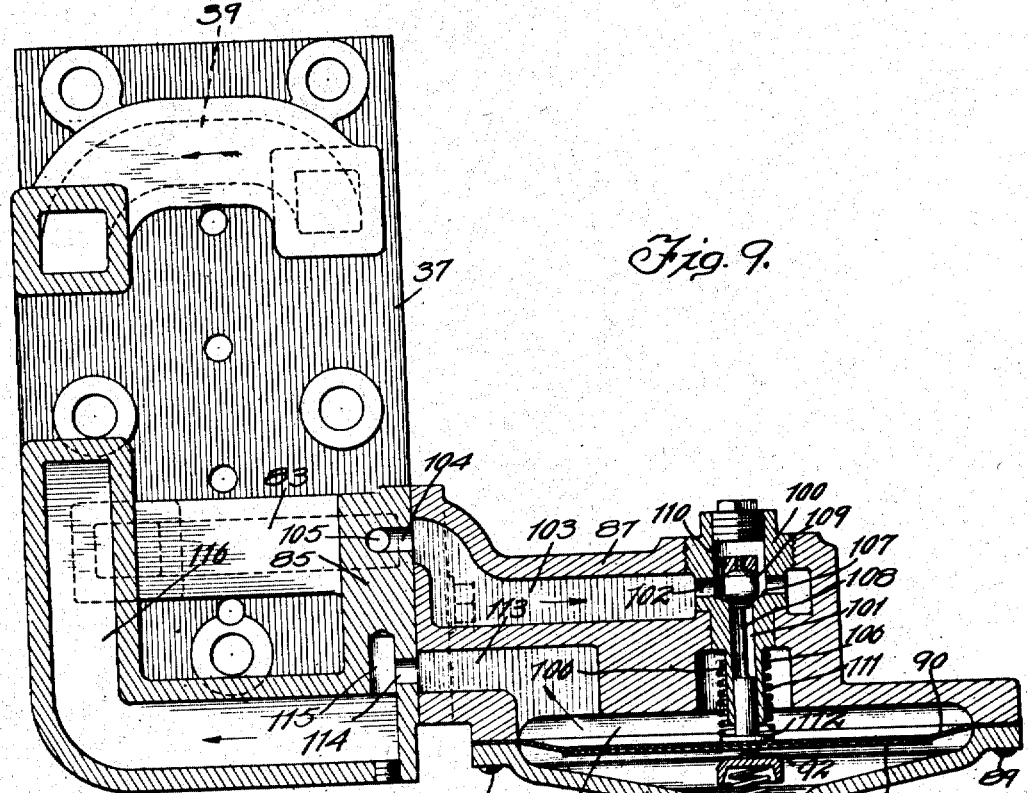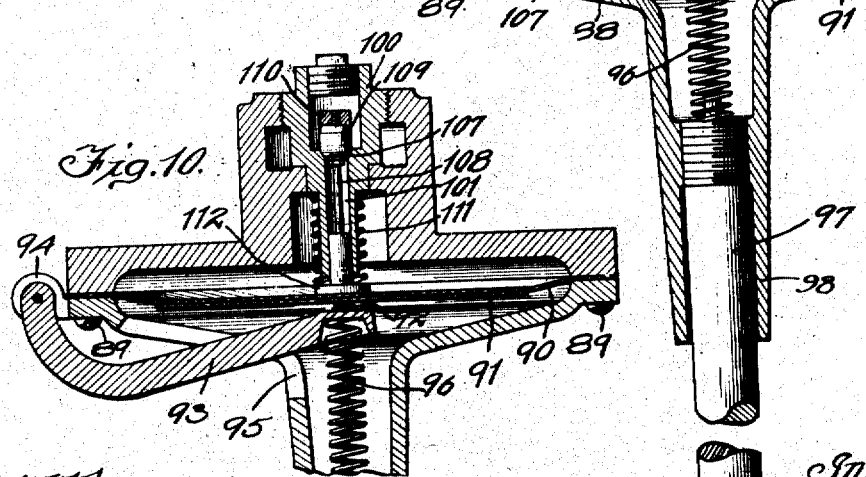

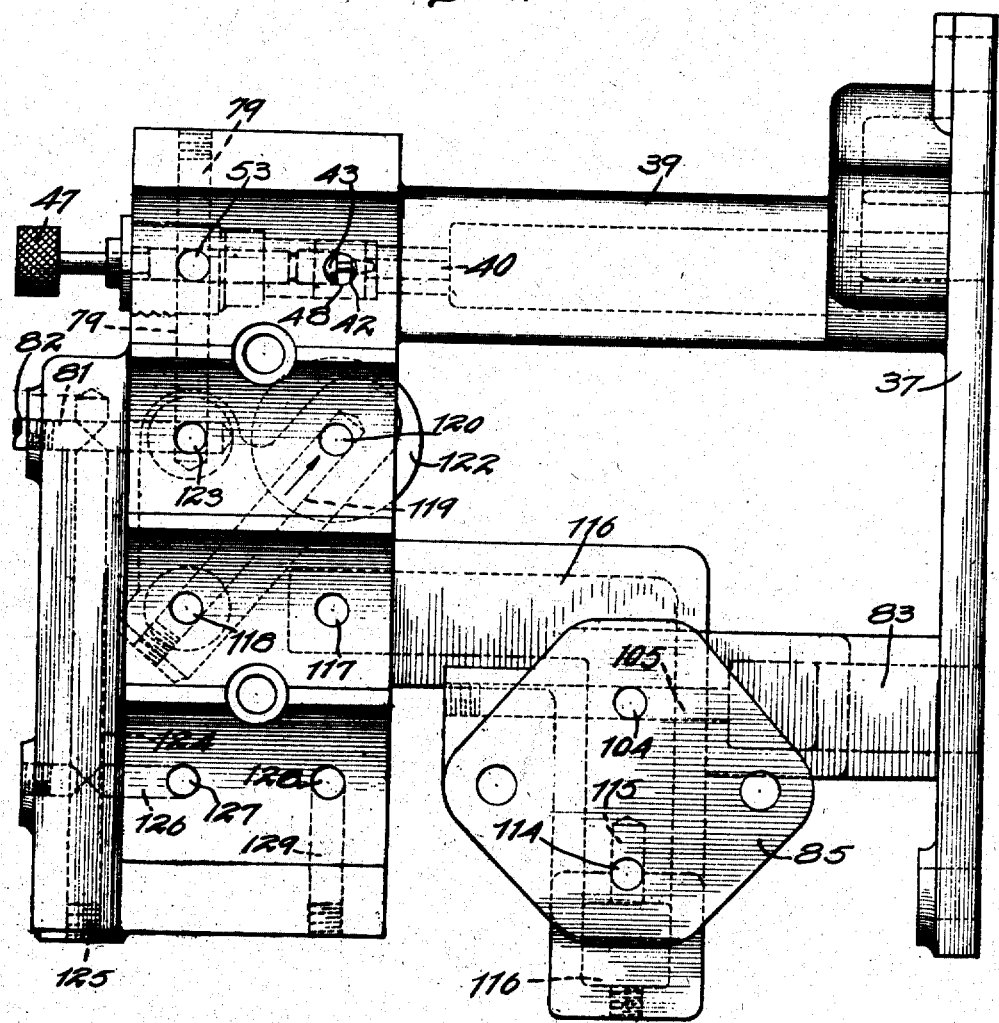

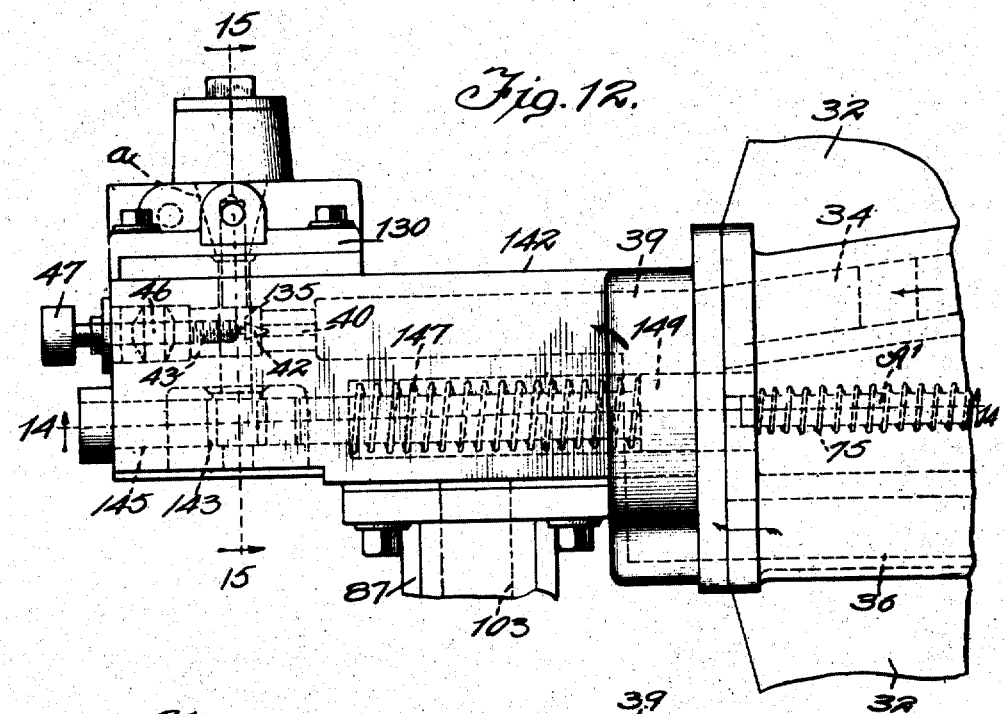
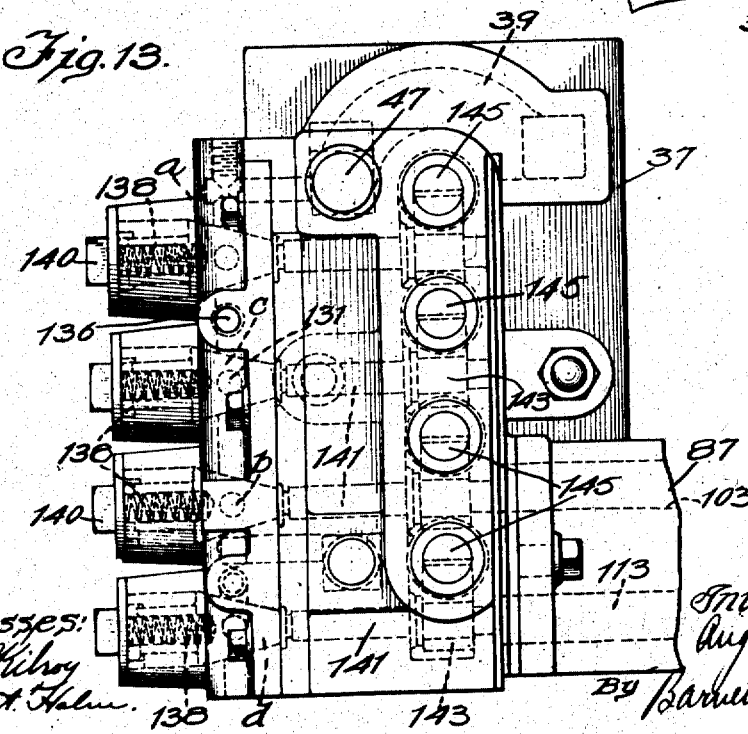

1,255,317.

Patented Feb. 5, 1918.
10 SHEETS—SHEET 9.

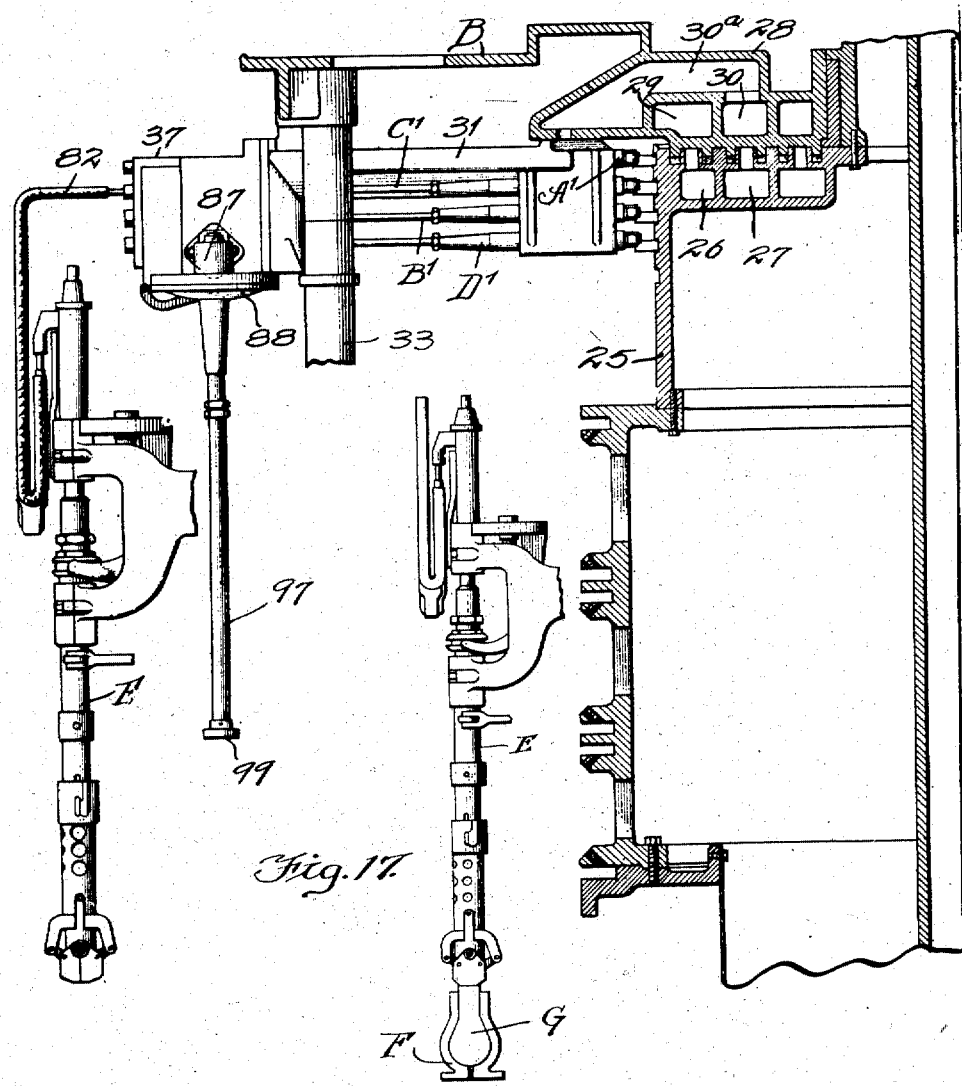

UNITED STATES PATENT OFFICE.

AUGUST KADOW, OF TOLEDO, OHIO, ASSIGNOR TO THE WESTLAKE MACHINE COMPANY, OF TOLEDO, OHIO, A CORPORATION OF OHIO.

AIR-CONTROLLING MECHANISM FOR GLASS-BLOWING MACHINES.

1,255,317.      Specification of Letters Patent.      Patented Feb. 5, 1918.

Application filed September 11, 1912. Serial No. 719,865.

*To all whom it may concern:*

Be it known that I, AUGUST KADOW, a citizen of the United States, residing at Toledo, in the county of Lucas and State of Ohio, have invented certain new and useful Improvements in Air-Controlling Mechanism for Glass-Blowing Machines, of which the following is a specification.

My invention relates to automatic glass blowing machinery and its object is to provide improved mechanism for controlling the compressed air used in the operation of blowing the glass.

Viewed more specifically, the invention has for its object certain improvements in the air controlling mechanisms forming a part of the glass working machine disclosed in my copending application filed July 6, 1910, Serial No. 570,621, and in my application Serial No. 628,225, filed May 19, 1911, (patented Aug. 22, 1916, as Patent No. 1,195,588,) which is a division of the aforementioned application covering particularly the air controlling mechanisms disclosed but not claimed in the parent case. While the immediate object of the present invention is to provide certain improvements upon the machine referred to and the invention will be described in the following specification in its application to said machine, the air control system which I have devised and seek to cover herein might be utilized in glass blowing machinery quite different in general organization from the machine of my prior applications.

The compressed air control system of the machine of application Serial No. 570,621 showed that it possessed certain defects in operation which would have to be cured if the best results were to be obtained under all conditions of use. The machine provided for the introduction of compressed air into the blank, at certain stages of the manufacture, in puffs or measured bodies. The old machine was not capable of measuring the pressure, volume and duration of these puffs with the accuracy required by practical conditions. The air-pressure employed for these operations is relatively high. It may be as high as eight or ten pounds per square inch, although a pressure as high as this is not always necessary or desirable. The machine also employs compressed air at a relatively low pressure, say from four to eight ounces per square inch. This pressure is used in the final development of the blank in the finishing mold. With reference to the low pressure air, my present invention provides an arrangement for applying this pressure to the blank gradually, as has been found necessary in order to prevent the blank from binding against the mold and becoming distorted as it is revolved in the mold. The character and quality of the glass operated upon inevitably varies. Sometimes it will be softer at the moment it is subjected to the air pressure than at others. If the pressure of the body of air introduced into the blank is in excess of that required by the condition of the glass, the blank will be expanded too much, or distorted. On the other hand, if the pressure is less than that required the blank will not be sufficiently expanded. In a complicated machine of considerable size consisting of a number of parts, some of which have relative movement with respect to each other, it is impossible under practical working conditions to maintain a given pressure at or near the place where the compressed air is used by maintaining the air in the supply tank at a constant pressure. The leakage which is sure to take place, particularly in a machine consisting of a number of working units like the machine referred to, cannot be calculated accurately. Moreover, a bad leak in one unit will throw the air system for the entire machine out of adjustment. The air control system of my machine as originally constructed, while operating successfully under certain conditions, was not susceptible of the extreme nicety of adjustment required by the character of the material operated upon—molten or semi-congealed glass; furthermore, such adjustment as was possible to obtain could only be obtained with difficulty. Ordinarily, to readjust the machine for a different quality of glass it was necessary to stop it and take the valves apart. My present invention provides a compressed air controlling apparatus in which the pressures and volumes of air delivered to the blank may be determined with the utmost accuracy. Furthermore, this adjustment may be made for each working unit of the machine and may be made while the machine is in operation. This is important because it thereby becomes possible to obtain an adjustment which is exactly required by the condition of the glass operated upon at the time and to vary that adjustment as conditions vary.

A further objection to the air control system of my original machine was that the valves did not always seat with perfect accuracy nor move with the certainty and quickness required. The present invention provides a novel form of air controlling valve and a novel mechanism for operating the same which exactly meets the peculiar requirements of machinery of this sort.

The invention consists further in the novel and improved mechanisms, combinations and the devices relating to glass blowing machinery which are shown in the accompanying drawings and will be hereinafter described and claimed.

The invention is illustrated in certain preferred embodiments in the accompanying drawings, wherein—

Figure 1 is a fragmentary, sectional plan of a glass blowing machine constructed in accordance with my invention;

Fig. 2, a radial, sectional view taken on line 2—2 of Fig. 1, looking in the direction of the arrows;

Fig. 3, a plan view of the compressed air controlling mechanism, a portion of which is shown in the preceding figures;

Fig. 4, a sectional view taken on line 4—4 of Fig. 3, looking in the direction of the arrows;

Fig. 5, a cross-sectional view taken on line 5—5 of Fig. 4, looking in the direction of the arrows;

Fig. 6, an elevation of the outer end of the apparatus with certain parts broken away;

Fig. 7, a sectional plan on line 7—7 of Fig. 6;

Fig. 8, a sectional view on line 8—8 of Fig. 7, looking in the direction of the arrows;

Figs. 9 and 10, similar views taken on lines 9—9 and 10—10 of Fig. 3, looking in the direction of the arrows in each case;

Fig. 11, a side elevation of the casting supporting the controlling valves with said valves and their casings removed;

Fig. 12, a fragmentary plan view of a modified construction in which the valves corresponding to the plunger operated reciprocating valves of the other construction are rotary valves instead of the reciprocating type;

Fig. 13, an end elevation of the same;

Figs. 14 and 15, sectional views taken on lines 14—14 and 15—15, respectively, of Fig. 12;

Fig. 16, a view showing in elevation the air controlling mechanism of the present invention, together with the spindle or blowpipe, and in section certain associated portions of the glass forming machine; and Fig. 17 is a diagrammatic sectional view showing the blank inclosed in the finishing mold.

Like characters of reference designate like parts in the several figures of the drawings.

As stated, the invention will be described as applied to and forming a part of a glass blowing machine similar, in its general organization, to that shown in my copending application Serial No. 570,621, and in Patent 1,195,588, referred to above. In that machine a central drum is provided around which rotates a framework carrying a number of identically constructed glass working units. Each unit consists of a blowpipe or spindle, as it has been termed because of its capacity for axial rotation, and certain other devices for producing the blown glass article. The article which the machine in question is particularly designed to produce is a common, pear-shaped electric light bulb. It will be sufficient to state, for the understanding of the present invention, that each glass working unit is provided with a device which, at a certain point in the rotation of the machine around the stationary drum, enters the working opening of the glass furnace, withdraws a charge of glass and secures it to the end of the blowpipe or spindle. The blowpipe at this time is in a vertical position with its open end upward. The blank is developed by certain movements of the blow-pipe accompanied by the introduction of high pressure air thereinto in the form of puffs. The blank is completed while being inclosed in the finishing mold. It is rotated in the mold by revolving the blow-pipe on its longitudinal axis. During this operation low pressure air is introduced into the blank in the manner to be hereinafter described.

*General description of apparatus.*

Referring now to the preferred form of apparatus shown in Figs. 1 to 11, inclusive, 25 (Figs. 1, 2, 16 and 17) designates the stationary drum of the machine formed with the high pressure chamber 26 and the low pressure chamber 27, these chambers being connected with suitable exhausting apparatus, not shown, which maintains air in the chambers at different pressures above atmospheric pressure. Rotatably mounted on the top of the drum 25 is an annular structure 28 forming a part of the rotating framework of the machine formed with air chambers 29 and 30 communicating with the chambers 26, 27, respectively. The structure 28, only a part of which is shown, supports several glass forming units. Each unit comprises a mechanism for controlling the compressed air supplied to the blowpipe of said unit; these mechanisms constituting the subject-matter of my present invention.

These mechanisms are all alike for the different units and, therefore, but a single one will be described. It should be understood, however, that the arrangement and constructions of valves which I have devised is of particular utility when used for providing separate controlling means for the several units of a machine of the sort referred to because an air control system of this sort permits an accurate adjustment for each unit to take care of the leakages of the particular units which may vary as between the different units.

Secured to the under side of the annular structure 28 adjacent to the other elements of each glass unit, is a casting 31 preferably formed with arms or wings 32, 32 (Fig. 3) which are bolted to the uprights 33 forming a part of the rotating framework of the machine. The casting 31 has a high pressure port 34 communicating with the port 35 leading from the chamber 29 and with a low pressure port 36 communicating by port 30$^a$ (Fig. 16) with the low pressure chamber 30. The admission of the low pressure air to the blowpipe is governed by a valve designated as a whole by the letter A (see particularly Fig. 4). This valve is periodically unseated by a plunger designated A' which meets certain cams A$^2$ on the periphery of the stationary drum 25 (Fig. 2). The admission of high pressure air to the spindle is governed by two valves B and C, operated by similar plungers B', C', actuated by cams B$^2$, C$^2$. D designates a relief valve by which the air system and the blank are put into communication with the atmosphere in order to relieve the pressure. This valve is operated by a plunger D' from cams similar to those which actuated the other plungers. The valves A, B, C and D are secured to a casting 37 which is attached to casting 31 by the bolts 38. The blowpipe or spindle is designated E (Fig. 16) and is supported on the rotating frame by certain devices which need not be described. The finishing mold (Fig. 17) is designated F and the finished bulb or blank is designated G.

*The low pressure controlling mechanism.*

The low pressure duct 36 in the casting 31 communicates with a duct 39 in the casting 37 (Figs. 3, 6, 7 and 11). In the drawings semi-feathered arrows will be used to indicate the course of the low pressure air. The course of the high pressure air will be indicated by unfeathered arrows. The duct 39 leads to a port 40 of relatively small cross-sectional area formed in a bushing 41. Into the other end of this port extends a needle valve 42 (Fig. 7), the stem 43 of which has a threaded engagement with a ring 44 seated in a cavity 45 formed in the casting 37. The stem of the needle valve passes through a stuffing box 46 and is provided at its outer end with the knurled head 47. The purpose of the needle valve is to retard the flow of air through the duct leading to the blow-pipe when the valve 60, to be hereafter described, is opened. The needle valve is intended to stand open, in the operation of the machine, so as to restrict the low pressure air duct, thereby making the application of the low pressure air against the glass while in the finishing mold gradual instead of sudden. The sudden application, even of a low pressure of air, will produce a distortion of the blank because of the tendency of the blank to bind in the mold instead of rotating therein freely. The air entering the chamber 45 past the needle valve passes through the port 48 into a port 49 formed in the casing 50 of the valve A. The valve casing is formed with a beveled valve seat 51 and with an outlet port 52 communicating with a duct 53 in the casting 37. Within the casing is a valve stem 54 one end of which 55 is guided in a bore 56 formed in the bonnet 56$^a$, the other end 57 being formed with an enlargement 58 fitting into a gland 59. A ball valve of the "Fuller ball" type 60 of rubber or other resilient material is secured on the stem 54. Preferably, the center portion of the stem is threaded as indicated at 61 and the end 57 given a larger diameter so that a shoulder is provided against which the valve is pressed by means of the nut 62. A spring 63 is interposed between the nut 62 and the bonnet 56$^a$ and tends to keep the valve seated. Any wear may be taken up by an adjustment of the nut 62. The valve casing 50 is formed on the end with a boss 64 threaded to receive the cap 65. A follower rod 66 extends through the end of the cap and into the gland 59. The inner end of the rod is provided with a collar 67 and the outer end with a disk 68, a spiral spring 69 being interposed between the disk and a boss 70 formed on the cap. The follower is packed by the packing 71, preferably held in place by the ring 72 against which bears the spiral spring 73. The collar 67 serves to hold the follower in place against the tension of spring 69 and at the same time provides a valve to prevent the escape of air from the valve casing at this point. The follower, it will be seen, normally stands out of contact with the stem of valve 60. The follower is made separate from and spaced away from the stem of valve 60 for several reasons. In the first place, it makes the valve 60 more sensitive and allows it to seat more accurately as its stem is not affected by the packing 71 surrounding the follower. It is difficult to insert a packing so that it would be perfectly even and uniform. If the valve stem were made integral with the follower the packing would be likely to throw the valve stem out of alinement so that the valve would not operate reliably. Furthermore, by making these two elements separate the collar 67 on the end of the follower, by seating against the inside of the casing 50, acts as a valve to prevent the escape of air through the gland through which the follower passes. The follower is moved against the stem of the valve to open said valve by means of the plunger A'. The plunger (Fig. 4) is guided in suitable guides formed in the castings 31, 39 and is provided with a collar 74 against which bears a spiral spring 75. The outer end of the plunger is formed with a roller 76 adapted to engage the cam on the stationary drum of the machine. Preferably, the plunger is formed with a slot 77 (Figs. 3 and 4) into which projects a stop pin 78. When the roller 76 meets one of the cams A² the plunger is forced back into contact with the follower 66 and forces the same against the stem 57 of valve 60 opening the valve. Compressed air passes from the gland 59, through the valve chamber and port 52, and thence through the connecting ducts 53, 79 and 80 formed in the casting 37, to a duct 81 communicating with a pipe, preferably the rubber hose 82 (Figs. 3 and 11), by which the air is conducted to the spindle E.

*Controlling mechanisms for high pressure air.*

The high pressure air duct 34 in the casting 31 leads to a duct 83 in the casting 37. The latter casting is formed with a plate 85 (Figs. 3, 6, 9 and 11) to which is secured, by bolts 86, a casting 87 which, with the casting 88, secured to the first-named casting by screws 89, forms the casing of a pressure regulator made up of the following parts: 90 designates a rubber diaphragm secured between the castings 87, 88 and 91, a metal plate on the under side of said diaphragm which rests upon the knob 92 formed on the arm 93 pivoted to a fork 94 formed on the casting 88, the arm extending through an opening 95 in said last mentioned casting. A spiral spring 96 seated on the end of a threaded stem 97 bears against the arm 93. The stem 97 engages a threaded portion of the tubular member 98 constituting the lower part of the casting 88, the stem being formed with the knurled head 99. A plug 100 is set into the casting 87 and is formed with a bore 101 which communicates, by means of the ports 102, with a duct 103 in the casting which duct communicates by means of the ports 104, 105 with the high pressure air duct 83 in the casting 37. The lower part of the plug 100 is formed with ports 106 communicating with the space or diaphragm chamber 107 between the diaphragm 90 and the casting 87. Fitted within the bore 101 of the plug 100 is a valve stem 108. A rubber ball valve 109 is secured on the threaded end of the stem 108 by means of the nut 110. A spiral spring 111 intervenes between the under face of the plug 100 and a boss 112 on the valve stem 108. Leading from the diaphragm chamber 107 through the casting 87 is a duct 113 communicating by ports 114, 115, with a duct 116 formed in the casting 37. The air in the duct 116 passes through the valves B and C, when these valves are opened, in the manner to be described presently, and thence through the ducts 80, 81 to the spindle. The function of the regulator is to automatically regulate the pressure of air delivered to this end of the system, regardless of the pressure that may prevail in the source of supply and in the various air passages leading to the valve 109. The air from the duct 103 passes the valve 109, assuming that the valve is unseated, and flows through the diaphragm chamber 107 and out through the duct 113. So long as the pressure on the low pressure side of the valve 109 is less than the pressure desired, valve 109 remains open. As soon as the desired pressure is reached the diaphragm 90 is forced down and this permits the spring 111 to seat the valve. The pressure thus produced in the part of the system beyond the regulator may be varied by turning the adjusting stem 97.

The valve B may be identical in its construction with the valve A, described above in connection with the description of the low pressure system. The air from duct 116 enters the valve B through a port 117 formed in the casting 37 (Fig. 11) which port communicates with a port in the casing of valve B corresponding to the port 49 of valve A (see Fig. 7). The air after going through the casing of valve B, assuming that the valve be opened, passes out through a port in the casing of valve B corresponding to the port 52 of valve A. This port leads to a port 118 communicating with a diagonally extending duct 119 which leads to a duct 120 registering with the inlet port of valve C, namely the port corresponding to the port 49 of valve A. The duct 120 extends through the casting 37 from the duct 119 in the direction opposite to the valve C and communicates with a pipe 121 supporting an air reservoir 122, as best shown in Fig. 6. Therefore, with the valve B open and the valve C closed, the air reservoir 122 will be filled with a body of compressed air, the volume of which is of course determined by the volumetric contents of the reservoir and associated air passages and the pressure of which will be adjustably fixed by the regulating apparatus above described. The outlet port of the valve C—the port corresponding to port 52 of valve A—registers with a duct 123 in the casting 37 which is in effect a continuation of the duct 80 through which the low pressure air passes to port 81 and the blowpipe. Therefore, when the valve B is closed and the valve C is opened, the body of air in the reservoir, and connecting passages, is discharged through the pipe into the body of glass thereon. The air is introduced into the blank in the form of a puff which, because it has a definite volume and a definite pressure, (for a blank of any given resistance) exerts a definite amount of expansive force within the blank, the duration of which is fixed. The amount of this force and its duration can be varied to compensate for a variation in the character of the glass by varying the pressure in the reservoir by a proper adjustment of the air regulating device above described.

If both valves B and C are held open simultaneously, which result may be obtained by a proper arrangement of the cams for actuating the pistons B′, C′, air at high pressure, but at a determinable pressure fixed by the adjustment of the regulator, will enter the blank in a continuous stream. In a machine such as that shown in my copending application No. 570,621, the air is introduced in puffs while the blank is being expanded and is introduced in a continuous stream when the blank is confined in the mold.

The relief valve.

The valve D, which in its construction is identical with valves A, B and C, is so arranged as to put the blowpipe and the air passages leading from the several governing valves A, B and C thereto in communication with the atmosphere as occasion may demand. For example, it has been found that in the manufacture of glass articles according to the method which has been outlined, it is desirable, particularly when the body of the glass is first expanded, to quickly relieve the pressure after each successive puff of air has been introduced into the blank. This causes the blank to momentarily collapse, an operation which facilitates the making of the article, for reasons which need not be stated.

Leading from the duct 80 is a downwardly extending duct 124 (Figs. 6, 8 and 11), the lower end of which is closed by the plug 125. From duct 124 a duct 126 leads to a duct 127 which latter duct registers with a port in the casing of valve D corresponding to the port 56 of valve A. The discharge port of valve D, corresponding with the inlet port 49 of valve A, registers with a duct 128 in the casing 37, this duct leading to a duct 129 which latter extends to the bottom of the casing. The valve D is opened by means of its plunger D′ when the latter meets a suitably placed cam on the drum 25. As the duct 124 communicates with the duct 81 which leads to the blowpipe, the pressure in the blowpipe, and in the blank, is relieved as soon as valve D is opened, the air passing out through the casing of valve D in the direction opposite to that of the flow of the air through the other valves.

In Figs. 12 to 15, inclusive, a modification is shown in which the valves, instead of being reciprocating valves, are rotated to open and close the ports which they control. The arrangement of plungers and cams is intended to be exactly the same as in the construction shown in the first 11 figures. The system of air passages and the general arrangement of the valves is also the same. In the modification the valves designated a, b, c and d, respectively, are conical valves, each being seated in a conical seat formed in the casting 130. Each valve is formed with a port 131. The ports of valves a, b and c are arranged to register with the air duct 132. The port of valve d is adapted to register with the relief port 133. 134 designates a duct leading from the needle valve 135 to the upper end of duct 132. 136 designates a duct through which the air is admitted to the blowpipe. A duct 137 leads from the duct 132 to the relief port 133. The construction of the four valve mechanisms is identical so that but one needs to be described. The valve is pressed to its seat by a spiral spring 138, the spring intervening between the valve and a conically pointed block 139 which bears against the bonnet 140. The valve is provided with a stem 141 rotatably mounted in the casting 142 and carrying on the end a sector gear 143 which is meshed by the teeth of a rack 144 formed on the plunger 145. The plunger is slidably mounted in a cylindrical opening 146 formed in the casting 142 in line with one of the cam-operated plungers A′, B′, etc. A spring 147 is interposed between a shoulder 148 formed on the casting and the head 149 of the plunger 145. When one of the cam-operated plunger rods A′, B′, etc., is forced inwardly by engagement with a cam on the stationary drum, it is thrust against the corresponding plunger 145. The movement of the plunger 145 rocks the valve, a, b, c or d, as the case may be, so that the port in said valve is alined with the duct which said valve controls.

While I have shown and described my invention as embodied in certain preferred constructions, it will be readily understood that modifications might be made without departing from the principles of the invention. Therefore, I do not wish to be understood as limiting the invention to these exact constructions, arrangements and devices.

I claim:

1. In air controlling mechanism for glass blowing machines, the combination with a valve, of a movable actuating device for intermittently opening said valve, a packed bearing and a spring-pressed element mounted in the bearing and interposed between said actuating device and said valve which is normally free from both the valve and the actuating device.

2. In air controlling mechanism for glass blowing machines, the combination with a spring-pressed valve, of a plunger operating to unseat the valve, a packed bearing, and a spring-pressed element mounted in the bearing and interposed between the valve and the plunger which is normally free from both valve and plunger.

3. In air controlling mechanism for glass blowing machines, the combination with a valve, of a movable actuating device for intermittently opening said valve, a packed bearing, and a transmitting element mounted in the bearing and interposed between said actuating device and valve which normally stands out of contact with said valve.

4. In air controlling mechanism for glass blowing machines, the combination with a spring-pressed valve, of a plunger operating to unseat the valve, a cam for actuating said plunger, a packed bearing, and a spring-pressed element mounted in the bearing and interposed between the plunger and valve which normally stands out of contact with said valve.

5. In air controlling mechanism for glass blowing machines, the combination with a casing formed interiorly with a valve seat, a valve slidably mounted in said casing, a follower extending through said casing in position to unseat said valve, a spring which normally holds the follower out of contact with said valve, means for moving said follower against said valve, and a collar on the inner end of said follower which limits the outward movement of the follower.

6. In air controlling mechanism for glass blowing machines, the combination with a casing formed interiorly with a seat, a valve stem slidably mounted in said casing, a rubber ball valve on said stem, a stuffing box at the end of said casing, a follower rod extending through said stuffing box in line with said valve stem but normally out of contact therewith, a plunger normally out of contact with said follower rod and a cam which moves the plunger against said follower rod.

7. In glass blowing apparatus, the combination with coöperating machine elements having relative movement with respect to each other, one of which is adapted to support a blowpipe, said elements being formed with a system of communicating passages providing a conduit through which air passes from a supply of compressed air to said blowpipe; of a valve to govern the admission of air to said blowpipe; means actuated by the relative movement between said elements for opening and closing said valve; a needle valve, having an adjustable member, whereby it may be positioned at various distances from its seat, arranged in said conduit in advance of said first-mentioned valve, a relief valve adapted to put said blowpipe in communication with the atmosphere, and means actuated by the relative movement between said machine elements for opening and closing said relief valve.

8. In glass blowing apparatus, the combination with coöperating machine elements having relative movement with respect to each other, one of which is adapted to support a blowpipe, said elements being formed with a system of communicating passages constituting a conduit through which air passes from a supply of compressed air to said blowpipe; of a valve which governs the admission of air to said blowpipe; means actuated by the relative movement between said elements for opening and closing said valve, and a needle valve which may be adjustably positioned to baffle or break the force of the air delivered to the blowpipe when said admission valve is open.

9. In glass blowing apparatus, the combination with coöperating machine elements having relative movement with respect to each other, one of which is adapted to support a blowpipe, said elements being formed with a system of communicating passages providing a conduit through which air passes from a supply of compressed air to said blowpipe; of an air reservoir; a valve which governs the admission of air to said reservoir; a valve which governs the outflow of air from said reservoir to the blowpipe; means actuated by the relative movement between said elements for opening and closing said valves in succession; and a regulating device arranged in said system immediately in advance of said admission valve which produces a definite pressure in said reservoir when the admission is opened.

10. In glass blowing apparatus, the combination with coöperating machine elements having relative movement with respect to each other, one of which is adapted to support a blowpipe, said elements being formed with a system of communicating passages providing a conduit through which air passes from a supply of compressed air to said blowpipe; of an air reservoir; a valve which governs the admission of air to said reservoir; a valve which governs the outflow of air from said reservoir to the blowpipe; means actuated by the relative movement between said elements for opening and closing said valves in succession; and a regulating device arranged in said system immediately in advance of said admission valve which produces a definite pressure in said reservoir when the admission is opened, said regulator having an adjusting member which can be manipulated to adjust the regulator to produce varying pressures.

11. In glass blowing apparatus, the combination with coöperating machine elements having relative movement with respect to each other, one of which is adapted to support a blowpipe, said elements being formed with a system of communicating passages providing a conduit through which air passes from a supply of compressed air to said blowpipe; of an air reservoir; a valve which governs the admission of air to said reservoir; a valve which governs the outflow of air from said reservoir to the blowpipe; means actuated by the relative movement between said elements for opening and closing said valves in succession; a regulating device arranged in said system immediately in advance of said admission valve which produces a definite pressure in said reservoir when the admission is opened; and means operated at other relative positions of said machine elements for simultaneously opening both of said valves.

12. In glass blowing apparatus, the combination with coöperating machine elements having relative movement with respect to each other, one of which is adapted to support a blowpipe, said elements being formed with a system of communicating passages forming a conduit through which air passes from a supply of compressed air to said blowpipe; of a valve which governs the admission of air to said blowpipe; means actuated by the relative movement between said elements for opening and closing said valve; and a regulating device arranged in said system adjacent said admission valve which automatically produces a definite pressure in said blowpipe and spaces communicating therewith when said admission valve is open, said regulating device having an adjusting member which can be manipulated to adjust said regulator to produce different pressures.

13. In glass-blowing apparatus, the combination with a blow-pipe, of air-controlling mechanism for the same comprising a valve casing provided with air-inlet and outlet ducts and formed with a seat, a valve of resilient material of the "Fuller ball" type adapted to bear against said seat, a spring to seat said valve, a follower capable of movement independent of the valve which projects into said casing and is adapted to unseat said valve, and means for imparting movement to the follower in the direction of its length.

14. In glass-blowing apparatus, the combination with a blow-pipe, of air-controlling mechanism for the same comprising a valve casing provided with air-inlet and outlet ducts and formed with a conical valve-seat, a valve of resilient material of the "Fuller ball" type having a rounded surface adapted to bear against said seat, a stem on which said valve is carried, means for guiding said stem, a spring to seat the valve, a separate follower which extends into said valve casing adjacent to but out of contact with the end of the valve stem, a packing for said follower, and means for moving the follower against the valve stem to unseat the valve.

15. In glass-blowing apparatus the combination with a blow-pipe, of air-controlling mechanism for the same comprising a valve-casing provided with air-inlet and outlet ducts and formed with a seat, a valve of resilient material of the "Fuller ball" type adapted to bear against said seat, a spring to seat said valve, a follower capable of movement independent of the valve which projects into said casing and is adapted to unseat said valve, means for imparting movement to the follower in the direction of its length, and an adjustable needle-valve arranged in said inlet duct to adjustably restrict the effective cross-sectional area of the same so as to retard the flow of air through said duct.

16. In glass-blowing apparatus the combination with a blow-pipe, of air-controlling mechanism for the same comprising a valve casing provided with air inlet and outlet ducts and formed with a conical valve-seat, a valve of resilient material of the "Fuller ball" type adapted to bear against said seat, a spring to seat said valve, a separate follower which extends into said valve casing adjacent to but out of contact with said valve, a packing for said follower, means for moving the follower to unseat said valve; a portion of said inlet duct being restricted to form an orifice of relatively small diameter, and a needle valve which projects into said orifice and has a stem in threaded engagement with the casing for the purpose of adjustment.

17. In glass-blowing apparatus, the combination with a revoluble blow-pipe and a finishing mold in which the blank is revolved and blown, of means providing a source of supply of low pressure air and a duct leading from the same to the blow-pipe, a valve to close said duct, mechanism for opening said valve while the blank is in the finishing mold, and an adjustable valve in said duct which is adapted in the operation of the machine to stand partially open to retard inflow through said duct so that the pressure is applied to the blank gradually when the first-named valve is opened.

18. In glass-blowing apparatus, the combination with a revoluble blow-pipe and a finishing mold in which the blank is revolved and blown, of means providing a source of supply of low pressure air and a duct leading from the same to the blow-pipe, a portion of which is of relatively small cross-sectional area, a valve of the "Fuller ball" type to close said duct, mechanism for opening said valve while the blank is in the finishing mold and a needle-valve which projects into the restricted portion of said duct and is longitudinally adjustable so as to retard the flow of air to the blow-pipe when the first-named valve is opened.

AUGUST KADOW.

Witnesses:
  GEORGE E. DIXON,
  L. F. LUSCOMBE.

It is hereby certified that in Letters Patent No. 1,255,317, granted February 5, 1918, upon the application of August Kadow, of Toledo, Ohio, for an improvement in "Air-Controlling Mechanism for Glass-Blowing Machines," an error appears in the printed specification requiring correction as follows: Page 5, line 56, for the reference-numeral "56" read *52*; and that the said Letters Patent should be read with this correction therein that the same may conform to the record of the case in the Patent Office.

Signed and sealed this 26th day of February, A. D., 1918.

[SEAL.]

F. W. H. CLAY,
*Acting Commissioner of Patents.*

Cl. 49—19